Dec. 19 1922.

J. W. SHAW,
PRUNE PICKER,
FILED MAY 31, 1921.

1,439,266

INVENTOR
John W. Shaw
BY John A. Naismith
ATTORNEY

Patented Dec. 19, 1922.

1,439,266

UNITED STATES PATENT OFFICE.

JOHN W. SHAW, OF SAN JOSE, CALIFORNIA, ASSIGNOR OF ONE-HALF TO JACK W. SHAW, OF SAN JOSE, CALIFORNIA.

PRUNE PICKER.

Application filed May 31, 1921. Serial No. 473,761.

*To all whom it may concern:*

Be it known that I, JOHN W. SHAW, a citizen of the United States, and a resident of San Jose, Santa Clara County, in the State of California, have invented certain new and useful Improvements in Prune Pickers, of which the following is a specification.

My invention relates to a device for picking up prunes from the surface of the ground and depositing them in a suitable receptacle.

It is the object of my invention to provide a device of the character indicated that will pick up the prunes without injury thereto; that will automatically brush the prunes from around the tree trunks into the path of travel of the device; and that will be simple in form and construction and efficient in its practical application.

Figure 2:
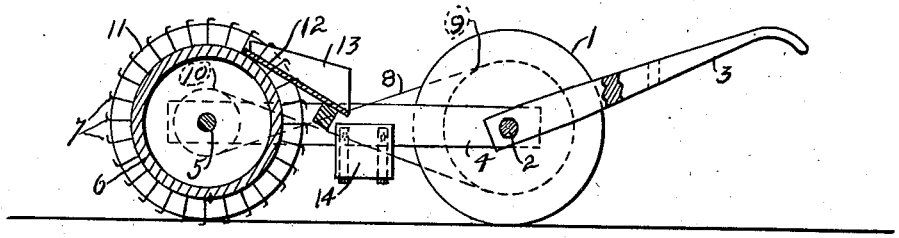
Figure 2 is a sectional view on line 2—2 of Figure 1.
Figure 1:
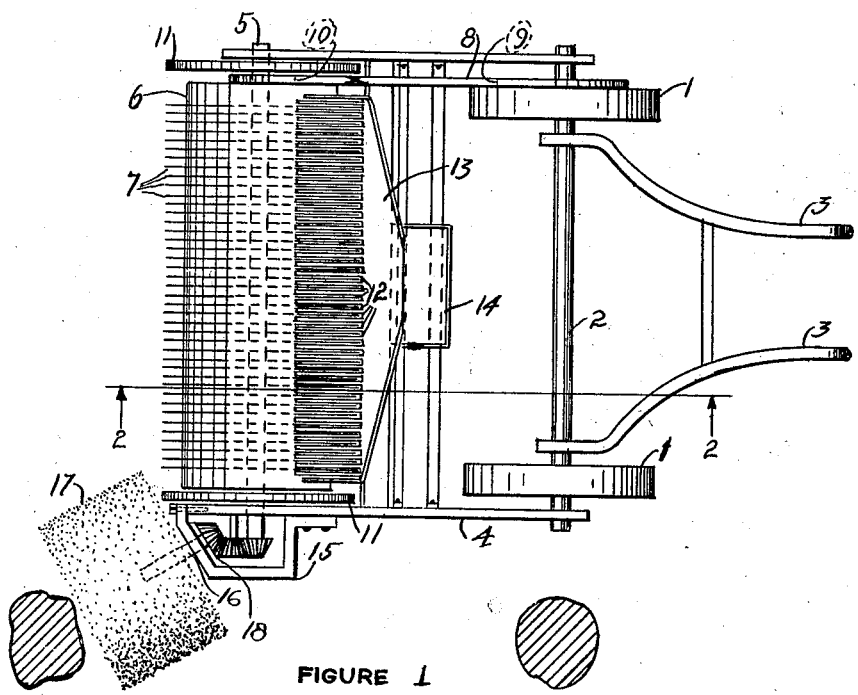
Figure 1 is a plan view of the device embodying my invention.

Referring more particularly to the drawing 1—1 indicates supporting wheels on a shaft 2 to which are secured handles 3—3. Pivotally mounted on shaft 2 and outside of wheels 1—1 is a frame 4, the same extending forwardly and provided with a shaft 5 revolubly mounted therein. Mounted within frame 4 and secured to shaft 5 to revolve therewith is a drum 6 fitted with radially arranged and interspaced hooks 7, the said drum being revolved backwardly by means of a crossed belt 8 on pulleys 9 and 10 on shaft 2 and 5 respectively.

Within frame 4 and mounted to revolve freely on shaft 5 are narrow wheels 11—11, to support the drum and maintain hooks 7 in proper relation to the ground over which they pass.

At 12 are indicated stripper elements mounted to contact with drum 6 between hooks 7 and fixedly secured to frame 4. A chute is shown at 13 arranged on frame 4 to receive the prunes from stripper 12 and conduct them to a waiting receptacle as at 14.

A bracket is shown at 15 mounted on frame 4 and carrying a shaft 16 extending forwardly and outwardly therefrom and fitted with a suitable brush 17. Shaft 16 is geared to shaft 5 as at 18.

In operation the device is moved forwardly over the ground in close proximity to a row of trees so that the shaft 16 just clears the trunks of the said trees. In moving forward the drum 6 is revolved backwardly through the medium of belt 8 and pulleys 9 and 10, and brush 17 is also revolved backwardly through the medium of gear connection 18. Since the flexible portion of the brush 17 extends a distance into the space between the aligned trees the prunes therein are swept out into the open in front of drum 6. The hooks 7 are of such a length that they readily enter the soft ground and in moving upwardly out of the ground they pick up the prunes and carry them up to stripper 12 where they are removed and deposited in receptacle 14.

It will be observed that in this form of prune picker the prunes are picked up without any injury thereto. Where prunes are picked up by means of pins that enter into them or engage their sides sufficiently to raise them from the ground, it is found that the natural fruit juices are caused to exude from the fruit, the fruit is impregnated with dirt or sand, and the lye used in processing is allowed to enter the fruit where it can not be washed away. Fruit that has been unduly crushed is difficult and sometimes impossible to dry and consequently that method occasions much loss.

In picking up fruit by means of the device herein described the same is not crushed, punctured or injured in any way. It is lifted from the ground by passing the fingers or hooks 7 underneath it instead of bringing pins or similar devices down upon it from above.

The ground operated over should be prepared somewhat before the fruit begins to drop. That is, it should be rendered as smooth and even as possible to secure the best results. Even when carefully prepared, however, it must necessarily be somewhat uneven, and to permit the fingers to operate effectively over both even and uneven places I have pivoted the frame 4 on shaft 2 so that wheels 11—11 and drum 6 with hooks 7 may follow closely the inequalities in the surface of the ground operated over.

It is to be understood of course that while I have herein shown and described one embodiment of my invention, changes in form, construction and method of operation may be made within the scope of the appended claims.

I claim:

1. A prune picker comprising a supporting frame, supporting wheels therefor, a drum mounted between one pair of wheels and revoluble with relation thereto, a plurality of prune engaging hooks on said drum, a stripper operatively mounted with relation to said hooks, means for receiving prunes from said stripper, and means for driving the drum in an opposite direction to the movement of the supporting wheels.

2. A prune picker, a drum, wheels supporting the same a distance from the ground, a plurality of hooks arranged on the drum to engage prunes on the ground and remove the same therefrom, and means for simultaneously operating said wheels and drum in opposite directions.

3. A prune picker comprising driving wheels, a drum pivotally mounted with relation thereto, means operated by said wheels for rotating said drum in an opposite direction thereto, and a plurality of radially arranged and spaced hooks mounted on said drum to remove prunes from the surface of the ground passed over.

4. In a prune picker, a drum having a plurality of radially arranged and spaced hooks arranged thereon, the said hooks facing in the direction of rotation of the said drum.

5. In a prune picker, a drum, wheels supporting the same a distance from the ground, a plurality of hooks arranged on the drum to engage prunes on the ground and remove the same therefrom, a brush arranged to extend forwardly of and outwardly from said drum, a driving connection between said brush and drum, and means for simultaneously operating said wheels in one direction and said drum and brush in the opposite direction.

6. A prune picker comprising a revoluble drum, a plurality of hooks radially arranged thereon, means for supporting the drum free of the ground with said hooks extending below the surface of the ground, means for propelling said drum forward, and means for rotating said drum in a direction opposite to its direction of movement.

JOHN W. SHAW.